(12) United States Patent
Zong

(10) Patent No.: US 9,245,207 B2
(45) Date of Patent: Jan. 26, 2016

(54) DIFFERENTIATING ABANDONED AND REMOVED OBJECT USING TEMPORAL EDGE INFORMATION

(71) Applicant: CANON KABUSHIKI KAISHA, Tokyo (JP)

(72) Inventor: Zhimin Zong, Seattle, WA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/031,942

(22) Filed: Sep. 19, 2013

(65) Prior Publication Data

US 2014/0233793 A1  Aug. 21, 2014

(30) Foreign Application Priority Data

Sep. 21, 2012 (AU) ................................ 2012227263

(51) Int. Cl.
| | | |
|---|---|---|
| G06K 9/00 | (2006.01) | |
| G06K 9/62 | (2006.01) | |
| G06T 7/20 | (2006.01) | |
| G06T 7/00 | (2006.01) | |

(52) U.S. Cl.
CPC .......... *G06K 9/6277* (2013.01); *G06K 9/00771* (2013.01); *G06T 7/0083* (2013.01); *G06T 7/0085* (2013.01); *G06T 7/2033* (2013.01); *G06T 7/2053* (2013.01); *G06T 2207/10016* (2013.01); *G06T 2207/20021* (2013.01); *G06T 2207/30112* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,731,805 B2 | 5/2004 | Brodsky et al. | |
| 6,999,600 B2* | 2/2006 | Venetianer | G06K 9/00624 348/169 |
| 8,422,791 B2* | 4/2013 | Liu et al. | 382/199 |
| 8,483,481 B2* | 7/2013 | Feris | G06K 9/00771 382/164 |
| 8,611,590 B2* | 12/2013 | Pakulski | G06T 7/204 382/103 |
| 2004/0151342 A1 | 8/2004 | Venetianer et al. | |
| 2007/0122000 A1 | 5/2007 | Venetianer et al. | |
| 2009/0060278 A1* | 3/2009 | Hassan-Shafique | G06K 9/00771 382/103 |
| 2010/0128930 A1 | 5/2010 | Liu et al. | |
| 2012/0062738 A1* | 3/2012 | Ohkawa | G06T 7/2053 348/143 |
| 2012/0093362 A1* | 4/2012 | Liu | G06K 9/00771 382/103 |
| 2013/0027550 A1* | 1/2013 | Evangelio | G06K 9/00771 348/143 |

FOREIGN PATENT DOCUMENTS

AU  2008264229 A1  6/2010

OTHER PUBLICATIONS

Campos et al., "Discrimination of abandoned and stolen object based on active contours", AVSS 2011, conference taken on Aug. 30-Sep. 2, 2011.*
Tian et al., "Robust and efficient foreground analysis for real-time video surveillance", CVPR 2005.*
Connell et al., "Detection and tracking in the IBM PeopleVision system", ICME 2004.*

\* cited by examiner

*Primary Examiner* — Soo Park
(74) *Attorney, Agent, or Firm* — Canon U.S.A., Inc. IP Division

(57) ABSTRACT

Disclosed is a computer-implemented method for classifying a detected region of change of a video frame as indicating an abandoned object or a removed object, the detected region of change is classified as an removed object if the temporal change of the edge consistency is from a more consistent state to a less consistent state, and the detected region of change is classified as an abandoned object if the temporal change of the edge consistency if from a less consistent to a more consistent state.

9 Claims, 13 Drawing Sheets

DIFFERENTIATING ABANDONED AND REMOVED OBJECT USING TEMPORAL EDGE INFORMATION

REFERENCE TO RELATED PATENT APPLICATION(S)

This application claims the benefit under 35 U.S.C. §119 of the filing date of Australian Patent Application No 2012227263, filed 21 Sep. 2012, hereby incorporated by reference in its entirety as if fully set forth herein.

TECHNICAL FIELD

This invention relates generally to video analytics and, in particular, to distinguishing stationary foreground objects in a video from objects, previously considered to be in the background in the video, that have been removed.

BACKGROUND

Video cameras, such as Pan-Tilt-Zoom (PTZ) cameras, are omnipresent nowadays, mostly for surveillance purposes. The video cameras capture more data (hereinafter referred to as "video content" or "video data") than human viewers can typically process. Automatic analysis of video content is therefore needed.

One step often used in the processing of video content is the segmentation of video data into foreground objects and a background scene, or background. Such segmentation allows for further analysis, such as detection of specific foreground objects, or tracking of moving objects. Such further analysis may, for example, result in sending an alert to a security guard, perhaps upon detection of a foreground object such as a suspicious box or tracking an object, such as an unauthorised intruder, entering or leaving a predefined area of interest.

Two aspects of such analysis are of particular interest.

First is the detection of abandoned objects. An example of an abandoned object is an item of luggage that has been brought into the scene being monitored, such as an airport lobby, during a time interval covering a sequence of video frames, and where the object is subsequently left in the scene.

Second is the detection of removed objects. An example of a removed object is a painting hanging on the wall in an art gallery, that was previously considered to be part of the background of the scene that is being monitored during a time interval covering a sequence of video frames, and where the object has been removed from the scene.

A common approach to foreground/background segmentation is referred to as "background subtraction". In one example of this method a median pixel value for a pixel at a specified position in a scene, determined using pixel values for that pixel over a sequence of video frames, may be compared to a current pixel value for the pixel at that position in a current frame of the sequence of video frames. If the current pixel value is similar to the median pixel value, the pixel is considered to belong to the background. If however the current pixel value is not similar to the median pixel value, where the difference between the current pixel value and the median pixel value exceeds a specified threshold, then the pixel is considered to belong to a foreground object.

Using the aforementioned background subtraction approach, regions of change resulting from abandoned object events and removed object events are found to have similar properties. This is because both abandoned object events and removed object events result in a region of the scene that is different from a previous remembered background, however the region is otherwise not changing. It is sometimes advantageous to use a common technique to determine when either an abandoned object event or a removed object event has occurred, in order, for example, to signal an alert.

However, a problem with using such an approach to differentiate between abandoned object events and removed object events is that, to the detection system, the events are indistinguishable from each other. This can be a problem in circumstances where it is desirable for a surveillance system to be able to both draw the attention of an operator to the occurrence of such events, and also to be able to give different alerts based on the type of event that has occurred. In some cases abandoned object events may be of greater importance than removed object events, such as in the case of a suitcase being abandoned in a busy airport. In other cases removed object events may be of greater importance than abandoned object events, such as the case of a painting being removed from a wall in an art gallery.

It is possible to differentiate between the two events, to some degree, through an examination of boundary pixels of detected regions of change. It is found for example that a "strong" boundary on the region of change is typically more likely to indicate an abandoned object event, and a weak boundary is typically more likely to indicate a removed object event. Methods used to measure boundary strength include considerations of colour, texture and gradient. However, these pixel-based methods incur significant costs in terms of both high memory usage and costly computation time.

Moreover, a specified threshold is usually required in such methods. The boundary strength is compared to the threshold in order to make a final decision. In practice, the value of such a threshold is difficult to determine, and may be dependent upon the scene, or area of a scene. Learning a threshold for a scene, or for an area of a scene, requires heavy computation and thus is not feasible for camera applications.

SUMMARY

The present inventors have determined that a need exists to provide an improved method and system for detecting and distinguishing between abandoned object events and object removal events in the monitoring of video frames.

Disclosed are arrangements, referred to by the present inventors as "Orientation Transition Comparison" (OTC) arrangements, which seek to address the above problems by comparing, for a current frame and its historic scene model, a transition of the edge orientation for each boundary block. If the transition is from more random to less random, this indicates an abandoned object. If the transition is from less random to more random, this indicates a removed object.

According to a first aspect of the invention, there is provided a computer-implemented method for classifying a detected region of change (701) of a video frame as indicating one of an abandoned object (401) and a removed object, wherein a plurality of boundary blocks define a boundary of said detected region of change, said method comprising the steps of: (1) for each one of the plurality of said boundary blocks: (a) determining a first difference between a predicted edge orientation and an observed edge orientation of said boundary block; (b) determining a second difference between a historical edge orientation of said boundary block and at least one of the predicted edge orientation and the observed edge orientation of said boundary block; and (c) determining a temporal change of edge consistency based on the first and second difference; and (2) classifying said detected region of change as indicating said one of the abandoned object and the removed object based on the determined temporal change of edge consistency of the plurality of boundary blocks.

Other aspects of the invention are also disclosed.

BRIEF DESCRIPTION OF THE DRAWINGS

At least one embodiment of the present invention will now be described with reference to the drawings, in which.

DETAILED DESCRIPTION INCLUDING BEST MODE

Figure 1:
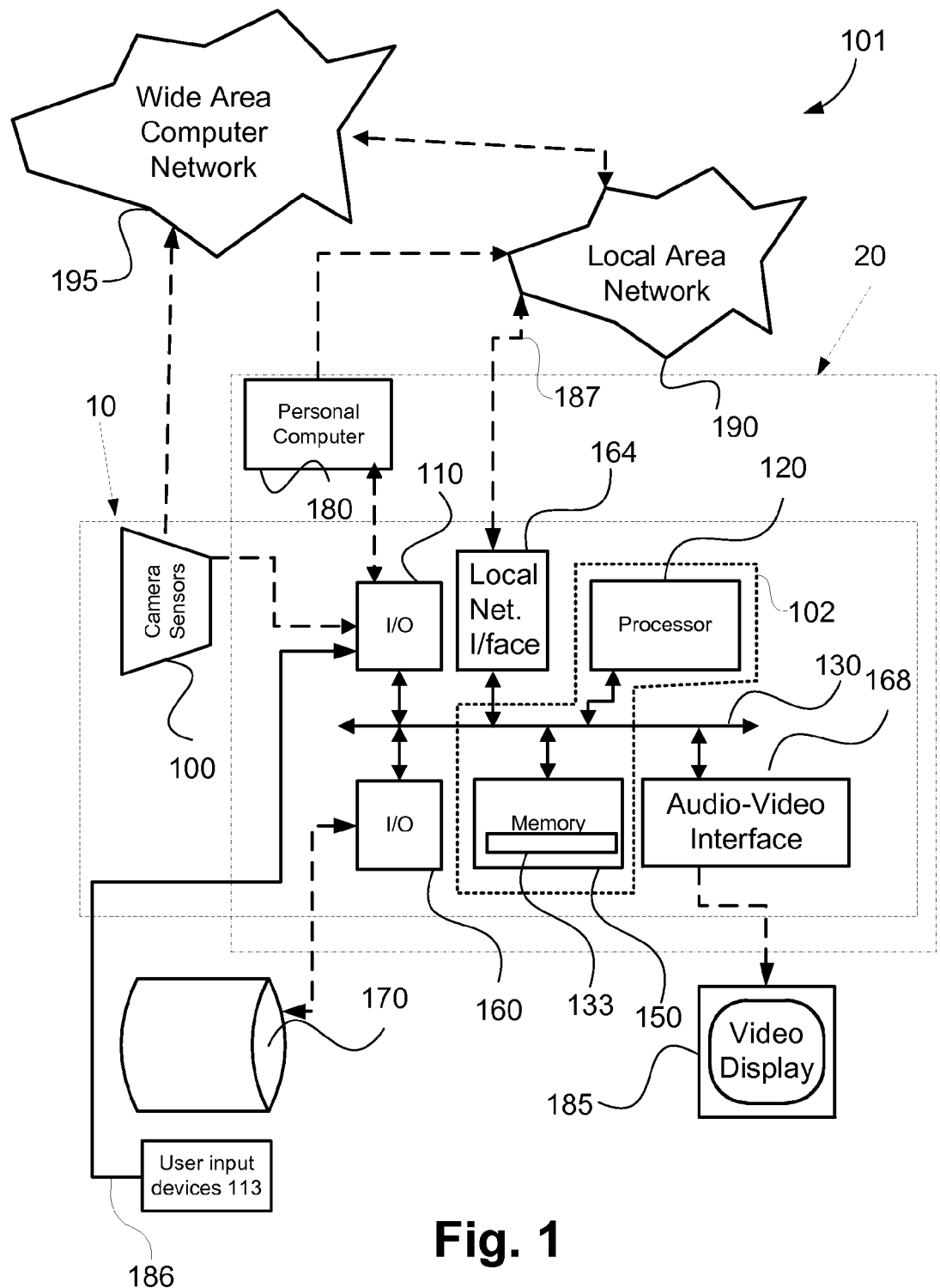
FIGS. 1 and 13 collectively form a schematic block diagram of a general purpose electronic system on which one or more described arrangements for detecting and distinguishing between abandoned object events and removed object events can be practised.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

Figure 8:
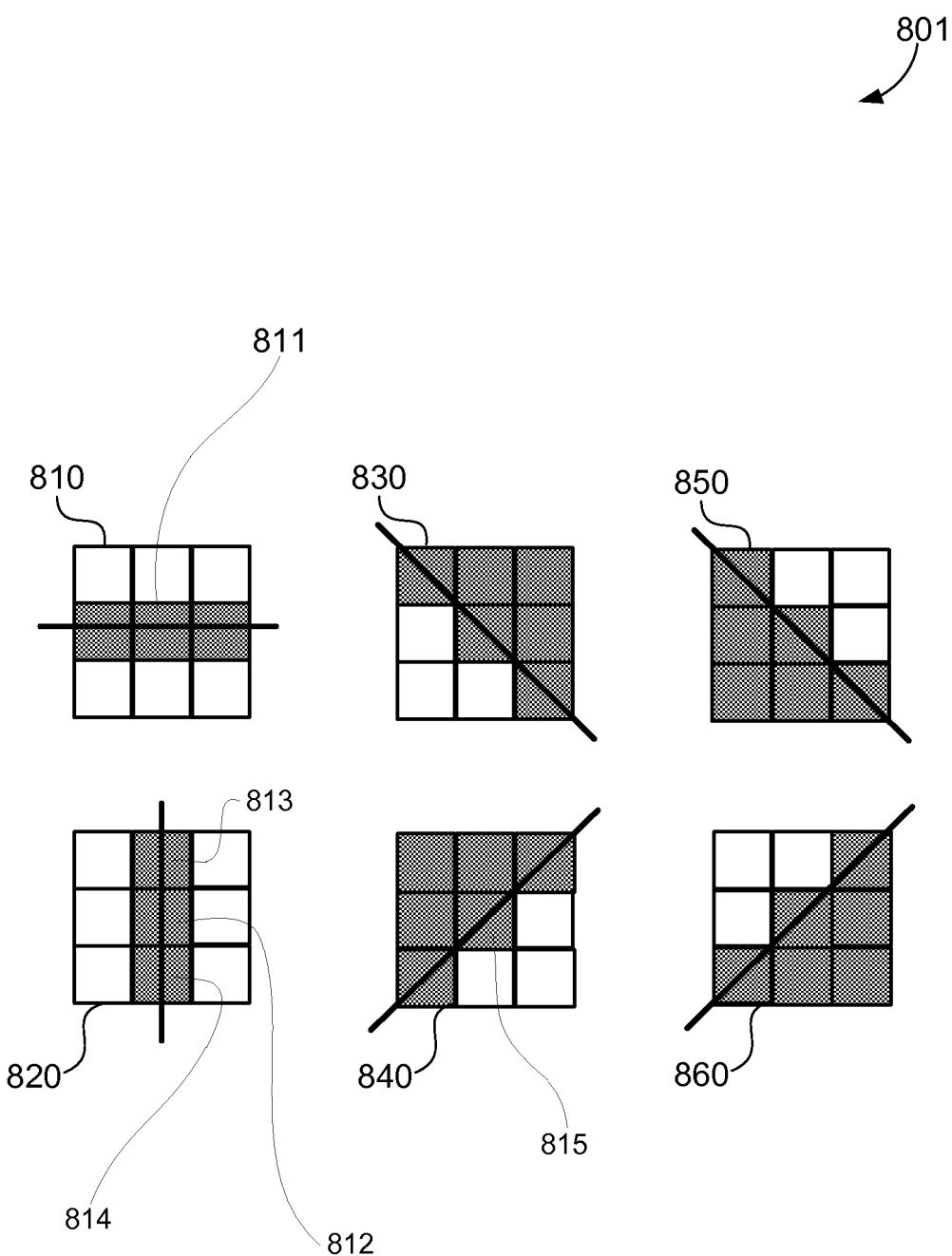
FIG. 8 is a schematic representation illustrating predicted edge characteristics of a detected region of change based on the local spatial arrangement, according to one OTC arrangement.

In this description the following terms have the defined meanings:

1. a "blob" is a collection of adjacent blocks that are considered to be the same object;
2. a "Block" is an 8×8 DCT block with 64 DCT coefficients available for processing. All referenced blocks are blob boundary blocks;
3. a "Local Neighbourhood Foreground Patterns" is the 3 by 3 neighbourhood of the current block (8-connected). The spatial arrangement of the foreground blocks can be used to determine the predicted edge orientation of the current block;
4. the "edge orientation" of a boundary block is depicted in FIG. 8;
5. a "transition" may assume one of two values namely (a) more consistent to less consistent (equivalently "less random" to "more random"), or (b) less consistent to more consistent (equivalently more random to less random);
6. a "transition score" is "1" if the transition is from less consistent to more consistent, and "−1" if the transition is from more consistent to less consistent;
7. the "edge strength" is defined at [000103] and equation [5];
8. the "local spatial arrangement" relates to the manner in which the foreground blocks (such as 813 and 814) in the 3×3 neighbourhood of the block in question (ie 812 in the set 820 of blocks in FIG. 8) are arranged;

Overview

Disclosed herein are a computer-implementable OTC method and system for classifying a detected region of change of a video frame as resulting from either an abandoned object event or a removed object event, wherein a plurality of boundary blocks define a boundary of the region of change. The boundary blocks may be, for example, Discrete Cosine Transform (DCT) blocks or pixels. For each one of a set of the boundary blocks, the OTC method determines a predicted edge characteristic for the boundary block and an observed edge characteristic for the boundary block. A history of the observed edge characteristic (historical edge characteristics) is also maintained. In one OTC arrangement, the predicted edge characteristic is determined for a given boundary block based on the relative positioning of the spatial arrangement of the boundary block and its adjacent blocks. The set of boundary blocks may include all of the boundary blocks that define the boundary of the region of change, or a subset of those boundary blocks, depending on the application. A reduced subset of boundary blocks may be used to reduce computational costs. In one OTC arrangement an observed edge characteristic is determined for the boundary DCT block in question based on the DCT coefficients of the block in question. An example of an edge characteristic that may be used is an orientation of the edge, and a value associated therewith.

The OTC method then determines an individual block score for the boundary block, based on the predicted edge characteristic for the boundary block, the observed edge characteristic for the boundary block and the history of the observed edge characteristics (historical edge characteristics). The OTC method determines an overall score for the region of change, based on the individual block scores of the boundary blocks. The method classifies the region of change as an abandoned object event or a removed object event, by checking the sign of the overall score.

Description of OTC Arrangements.

A video is a sequence of images or frames that make up the video content. Thus, each frame is an image in an image sequence. Each frame of the video has an x axis and a y axis. A scene is the information contained in a frame and may include, for example, foreground objects, background objects, or a combination thereof. A historic scene model is stored information relating to a background. A historic scene model generally relates to background information derived from an image sequence. A video may be encoded and compressed. Such encoding and compression may be performed intra-frame, such as motion-JPEG (M-JPEG), or inter-frame, such as specified in the H.264 standard.

An image is made up of visual elements. The visual elements may be, for example, pixels, or 8×8 DCT (Discrete Cosine Transform) blocks as used in JPEG images in a motion-JPEG stream. Thus, for example, in JPEG encoding the image is split into blocks of 8×8 pixels, and for each block, each of the Y, CB, and CR data undergoes a discrete cosine transform (DCT).

For the detection of real-world objects visible in a video according to one example of the OTC method, a foreground separation method is applied to individual frames of the video, resulting in detections of regions of change. Other methods of detecting real-world objects visible in a video are also known and may equally be practised in the OTC method. Such methods include, for example, image segmentation.

In one OTC arrangement, foreground separation is performed by frame differencing. Frame differencing subtracts a current frame from a previous frame. In another OTC arrangement, foreground separation is done by historic scene modelling. In historic scene modelling a scene model is created by aggregating the visual characteristics of pixels or blocks in the scene over multiple frames spanning a time period. Visual characteristics that have contributed consistently to the model are considered to form the background. Any area where the historic scene model is different from the current frame is then considered to be foreground.

Video cameras are often utilised for surveillance purposes. The abandonment of objects and removal of objects are of particular interest in such applications. A common example of an abandoned object in a video surveillance setting is a dropped bag or suspicious package that is placed in a scene that is being observed over a sequence of video frames.

In the disclosed OTC arrangements, for each region of change (also referred to as a "blob") in a video frame that is detected (see 1106 in FIG. 11), boundary DCT blocks are found (see 1108 in FIG. 11), and at each boundary DCT block a predicted edge characteristic is determined based on the arrangement of the DCT block in question and adjacent DCT blocks. An observed edge characteristic is also calculated for the boundary DCT block in question based on the DCT coefficients of the block in question. A historic scene model of the whole scene is maintained (see 1104 in FIG. 11) throughout all video frames using such observed edge characteristics to record the historical information.

The historic scene model can be generated in a number of ways. One straightforward way is to use simple averages. In this approach, for each DCT coefficient the historic values of the coefficient in question across all historic frames is accumulated, and the accumulated value is divided by the number of frames. Another approach uses a simple moving average of historic coefficient values, this involving constructing a time series formed by taking averages of several sequential values of another time series. Another method uses an exponential moving average which is a type of moving average that is similar to a simple moving average, except that more weight is given to the latest data. The exponential moving average is also known as "exponentially weighted moving average". All the aforementioned methods maintain a value for each DCT coefficient in the scene in question.

The difference between the predicted and observed edge characteristics is computed for both the current boundary DCT block in question and the history of the block in question as determined by the historic scene model.

The two differences 1208, 1214 represent how the observed edge characteristic 1205 is aligned with the predicted edge characteristic 1204. The two differences 1208, 1214 are then compared 1215, 1216 to determine the "transition" 1217 of the edge characteristic which is dependent upon whether the change, depicted by an arrow 1220, from the block in the historic scene model to the current block is "more consistent" or "less consistent".

A transition towards more consistent (i.e. the historic scene model is less aligned with the prediction than the current frame) will receive a positive score and a transition towards less consistent will receive a negative score.

Figure 12:
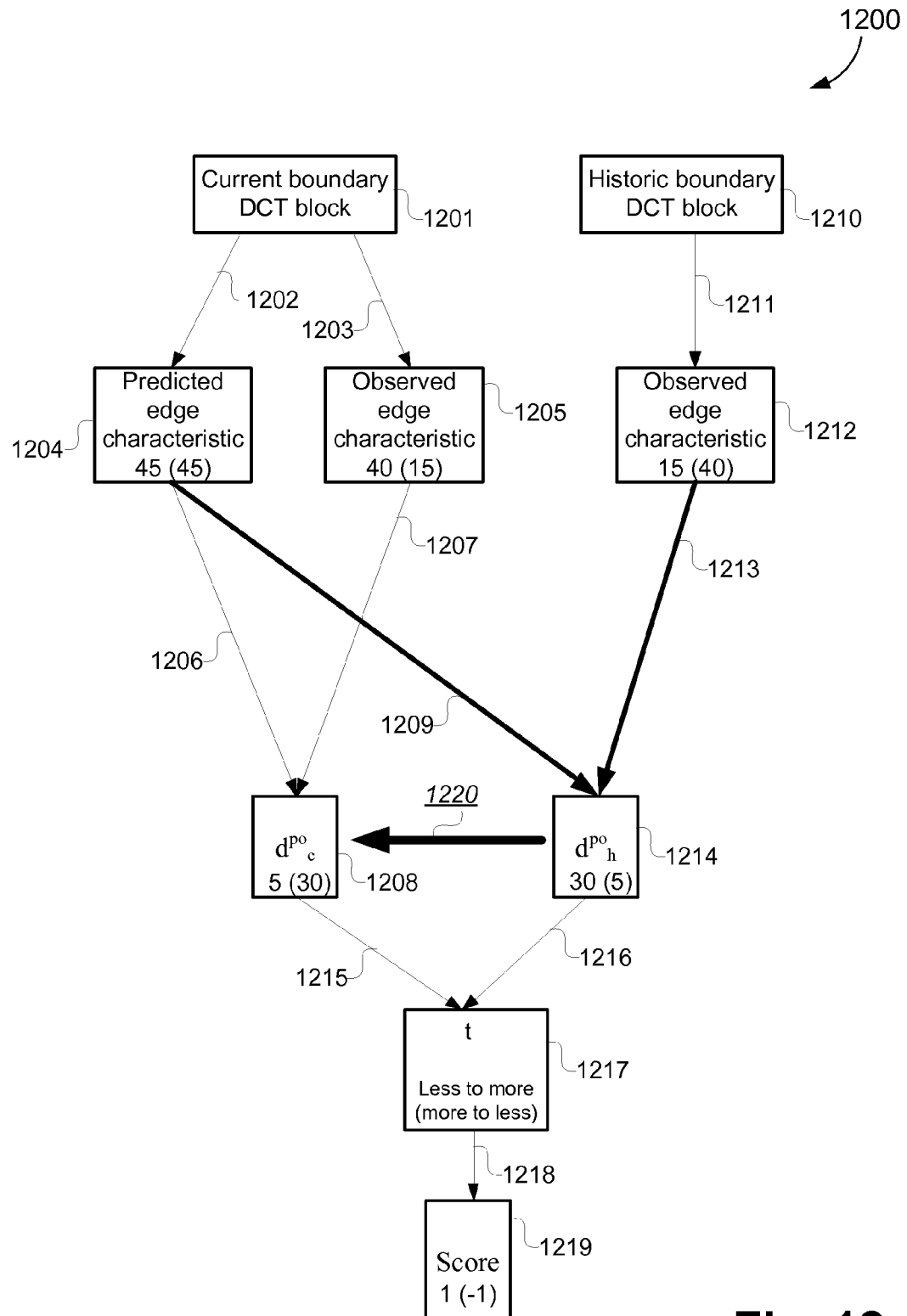
FIG. 12 shows, in pictorial form, an example of the determination of the transition determination and scoring used in the OTC arrangements.

FIG. 12 shows, in pictorial form, an example of how transitions and scoring are determined in the OTC arrangements. Having regard to a current one 1201 of a set of boundary blocks defining a region of change, the disclosed method predicts 1202 an edge orientation 1204 of the current block 1201 (referred to hereinafter as a predicted edge characteristic) based on the spatial arrangement of other local neighbourhood blocks, and determines 1203 an actual (ie observed) edge orientation 1205 of the current block 1201 (referred to hereinafter as an observed edge characteristic) using DCT coefficients of the block 1201. The method then determines 1206, 1207 a difference 1208 between the predicted edge characteristic 1204 and the observed edge characteristic 1205 of the current block 1201, and determines 1209, 1213 a difference 1214 between the predicted edge characteristic 1204 of the current block 1201 and an edge characteristic 1212 of a historic scene model 1210 of the current block 1201. The method then compares 1215, 1216 these two differences 1208, 1214 to determine a transition 1217, and defines 1218 a transition score 1219 depending upon whether the transition 1217 is from random to consistent (ie less random), in which event it indicates an abandoned object, or the transition is from consistent to random (ie more random), in which event it indicates a removed object. The method then adds the transition score (positive or negative) to an overall score of the boundary blocks defining the region of change (this overall score being initialised to a value of zero when commencing processing of the region of change in question), and the resulting overall score differentiates between abandoned and removed objects.

The following table (Table 1), read in conjunction with FIG. 12 presents numerical examples of how the OTC arrangement distinguished between abandoned objects and removed objects.

TABLE 1

| | Prediction | Observation (Current frame) | Observation (History) | Difference (P − OC) | Difference (P − OH) | Score | Result |
|---|---|---|---|---|---|---|---|
| Example1 | 45 | 40 | 15 | 5 | 30 | 1 | Abandoned Object |
| Example2 | 45 | 15 | 40 | 30 | 5 | −1 | Removed Object |

Example 1 (see row 1 in the above table) is depicted by numerals outside parentheses in FIG. 12. The predicted edge characteristic 1204 for the current block 1201 is an orientation having a value of 45 degrees, and the observed edge characteristic 1205 for the current block 1201 is an orientation having a value of 40 degrees. The difference 1208 between the predicted 1204 and the observed 1205 edge characteristics, depicting the alignment between these two edge characteristics, is therefore 5 degrees. The observed edge characteristic 1212 for the historic DCT block 1210 derived from the historic scene model (not shown) is an orientation having a value of 15 degrees. Accordingly, the difference 1214 between the predicted edge characteristic 1204 for the current block and the observed edge characteristic 1212 for the historic block 1210, depicting the alignment between these two edge characteristics, is 30 degrees. The alignment in the direction of the arrow 1220 thus changes from 30 degrees (see 1214) to 5 degrees (see 1208), which means a transition from a "less aligned" state to a "more aligned" state (or equivalently a more random state to a less random state). This results is a score 1219 of "1", which indicated an abandoned object because the boundary of the region of change has moved from being less consistent (ie more random) to more consistent (ie less random).

Example 2 (see row 2 in the above table) is depicted by numerals inside parentheses in FIG. 12. The predicted edge characteristic 1204 for the current block 1201 is an orientation having a value of 45 degrees, and the observed edge characteristic 1205 for the current block 1201 is an orientation having a value of 15 degrees. The difference 1208 between the predicted 1204 and the observed 1205 edge characteristics, depicting the alignment between these two edge characteristics, is therefore 30 degrees. The observed edge characteristic 1212 for the historic DCT block 1210 derived from the historic scene model (not shown) is an orientation having a value of 40 degrees. Accordingly, the difference 1214 between the predicted edge characteristic 1204 for the current block and the observed edge characteristic 1212 for the historic block 1210, depicting the alignment between these two edge characteristics, is 5 degrees. The alignment in the direction of the arrow 1220 thus changes from 5 degrees (see 1214) to 30 degrees (see 1208), which means a transition from a "more aligned" state to a "less aligned" state (or equivalently a less random state to a more random state). This results is a score 1219 of "−1", which indicated a removed object because the boundary of the region of change has moved from being more consistent (ie less random) to less consistent (ie more random).

An aggregate score is determined for each detected region of change based on the scores of each individual boundary DCT block, or possibly a subset of the blocks. A positive aggregate score indicates an abandoned object event. A negative aggregate score indicates a removed object event. An aggregate score of zero may be interpreted as "unknown", or may be assigned to either the positive score region or the negative score region.

Figure 11:
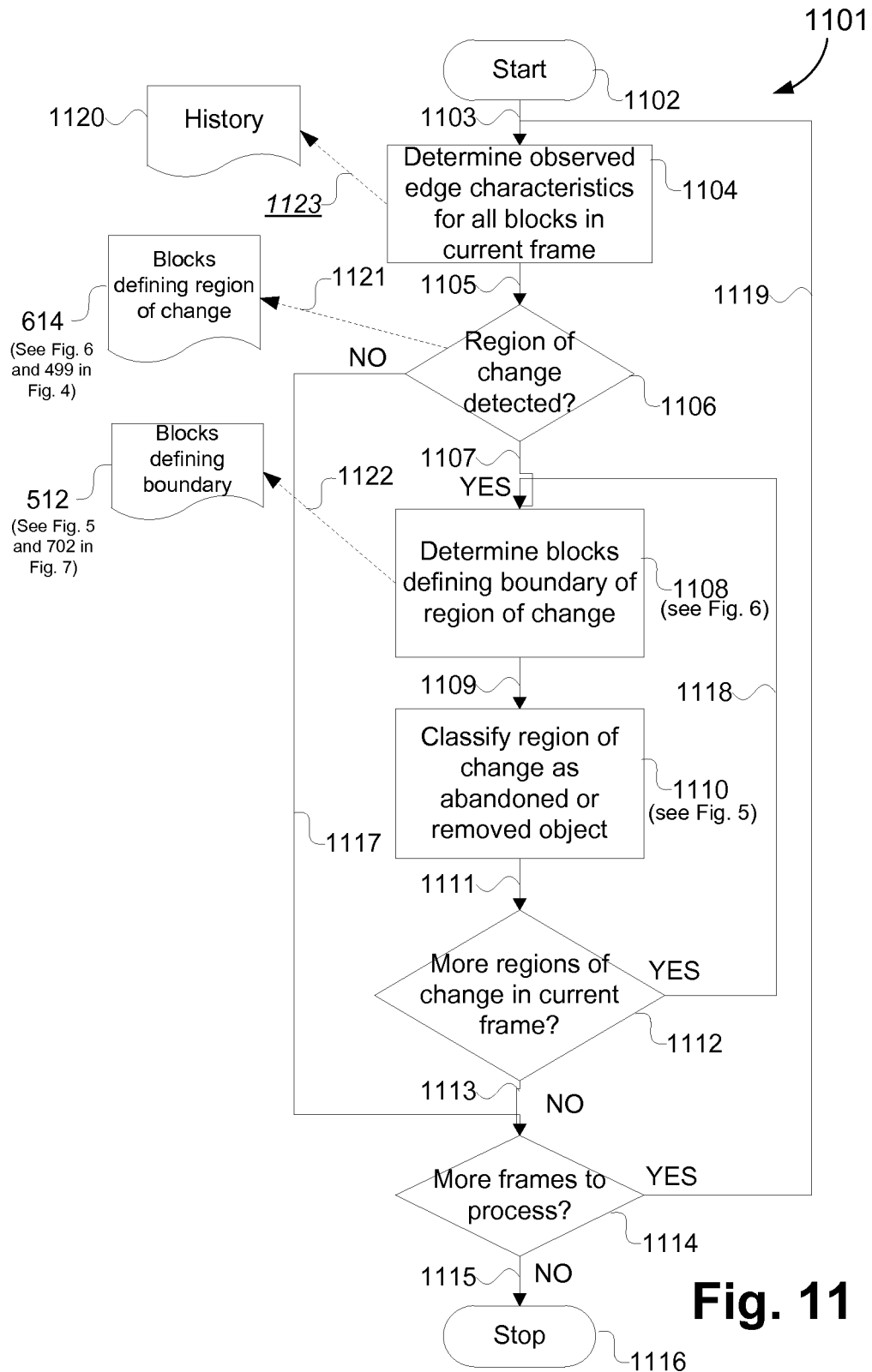
FIG. 11 is a flow chart depicting an example of a method for performing the OTC arrangement.

FIG. 11 is a flow chart depicting an example of a process 1101 for performing the OTC arrangement. The process 1101 starts with a start step 1102 and control the follows an arrow 1103 to a step 1104 in which a processor 120, directed by an OTC software application 133 (see FIG. 1) determines "observed edge characteristics" for all the blocks in the current frame. This information is accumulated in a memory 150 to form, as depicted by a dashed arrow 1123, a history 1120 of observed edge characteristics.

Control then follows an arrow 1105 to a decision step 1106 in which the processor 120 processes the current frame and determines if a region of change is present. If this is the case, the process 1101 outputs, as depicted by a dashed arrow 1121, the blocks 614 describing the region of change, and control then follows a YES arrow 1107 to a step 1108 in which the processor 120 identifies and outputs, as depicted by a dashed arrow 1122, a set of blocks 512 which define, fully or partially, the boundary of the region of change, as described hereinafter in more detail in regard to FIG. 6.

Control then follows an arrow 1109 to a step 1110 in which the processor 120 classifies the region of change as being associated with either an abandoned object or a removed object, described hereinafter in more detail in regard to FIG. 5.

Control then follows an arrow 1111 to a decision step 1112 in which the processor determines if there are more regions of change in the current frame. If this is not the case then control follows a NO arrow 1113 to a decision step 1114 in which the processor 120 determines if there are more frames in the present video to process. If this is not the case, then control follows a NO arrow 1115 to a Stop step 1116.

Returning to the decision step 1106, if a region of change is not detected in the current frame then control follows a NO arrow 1117 to the decision step 1114. Returning to the decision step 1112, if there are more regions of change in the current frame then control follows a YES arrow 1118 back to the step 1108. Returning to the decision step 1114, if there are more frames in the current video to process, then control follows a YES arrow 1119 back to the step 1104.

Figure 13:
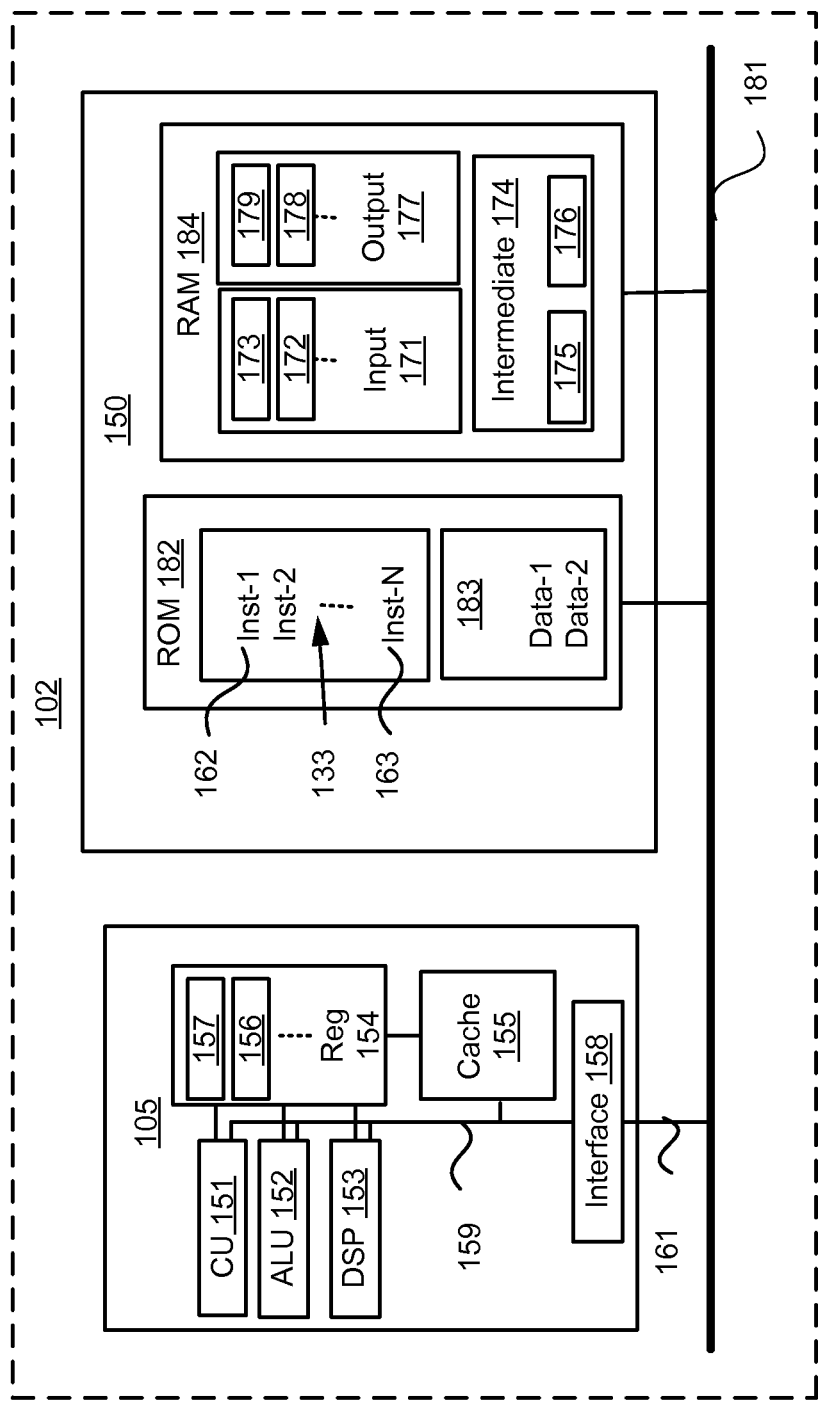

FIGS. 1 and 13 collectively form a schematic block diagram of a general purpose electronic system 101 including embedded components on which one or more described OTC arrangements for detecting abandoned object and object removal events can be practised. Sensors 100 are used to obtain the images of the image sequence. The sensors may represent a stand-alone sensor device (i.e., detector or a security camera) or may be part of an imaging device, such as a camera, a mobile phone, etc. The remaining electronic elements 110 to 168 may also be part of the imaging device comprising the camera sensors 100, as indicated by a dotted line 10. The electronic elements 110 to 168 may alternately be part of a computer system that is located either locally or remotely with respect to the sensors 100. In the case indicated by dotted line 20, the electronic elements form a part of personal computer 180.

The transmission of the images from the camera sensors 100 to the processing electronics 120 to 168 is facilitated by an input/output interface 110, which can be a serial bus compliant with Universal Serial Bus (USB) standards and having corresponding USB connectors. Alternatively, the image sequence may be retrieved from the camera sensors 100 via a Local Area Network 190 or a Wide Area Network 195. The image sequence may also be downloaded from a complementary portable memory device, ie a local storage device (e.g., 170), that can include SIM card, SD card, USB memory card, etc.

The images are obtained by input/output interface 110 and sent to the memory 150 or another of the processing elements 120 to 168 via a system bus 130. The processor 120 is arranged to retrieve information relating to one or more video frames from the sensors 100 or from the memory 150. The processor 120 is also arranged to fetch, decode and execute all the steps of the disclosed OTC method, as described hereinafter in more detail with reference to FIG. 13. The processor 120 then records the results from the respective operations to the memory 150, again using the system bus 130. Apart from the memory 150, the output can also be stored more permanently on a storage device 170, via an input/output interface 160. The same output may also be sent, via a network interface 164, either to a remote server via one or both of the networks 190 or 195, or to the personal computer 180, using an input/output interface 110. The output may also be displayed for human viewing, using an audio-video (AV) interface 168, on a monitor 185. Alternatively, the output may be processed further in other ways. One example of further processing may include using the output data, written back to memory 150, memory 170 or computer 180, as the input to a historic scene modelling system.

As described above and indicated in FIG. 1, the OTC method may be implemented in various ways. In one particular arrangement, indicated by the rectangle 10 in FIG. 1, the OTC method is implemented in an imaging device, such as a camera, a network camera, or a mobile phone with a camera. In this case, all the processing electronics 110 to 168 are part of the imaging device, as indicated by the rectangle 10. As described in the above description, such an imaging device for capturing a sequence of images and processing information from one or more of the captured images comprises the sensors 100, the memory 150, the processor 120, the input/output interface 110 and the system bus 130. The sensors 100 are arranged for capturing imaging data relating to visual elements of each image in the sequence of images. The memory 150 is used for storing each image in the sequence of images captured by the sensor and background scene information. The processor 120 is arranged for receiving, from the sensors 100 or from the memory 150, stored background scene information. The processor 120 also computes predicted and observed edge characteristics for each visual element that defines a boundary of a region of change in a video frame that is being analysed.

Further, the processor 100 is arranged to determine a score for a set of visual elements that define the boundary of the region of change. Depending on the application in which the OTC arrangement is being used and the particular implementation, not every one of the visual elements that define the boundary of the region of change may be processed by the processor 120. For some applications, for example, it may be sufficient to determine a score for every second or third, or some other selection, of those visual elements that define the boundary of the region of change. The processor is further arranged to determine an overall score for the region of change and thus determine whether the region of change relates to an abandoned object event or an object removal event. The input/output interface 110 facilitates the transmitting of the imaging data from the sensor 100 to the memory 150 and to the processor 120, while the system bus 130 transmits data between the input/output interface 110 and the processor 120.

As noted above, FIGS. 1 and 13 collectively form a schematic block diagram of a general purpose electronic device 101 including embedded components, upon which the OTC methods to be described are desirably practiced. The electronic device 101 may be, for example, a mobile phone, a portable media player or a digital camera, in which processing resources are limited, as depicted by the dashed line 10. Alternately, the OTC methods to be described may also be performed on higher-level devices such as desktop computers, server computers, and other such devices with significantly larger processing resources, as depicted by the dashed line 20.

As seen in FIG. 1, the electronic device 101 comprises an embedded controller 102. Accordingly, the electronic device 101 may be referred to as an "embedded device." In the present example, the controller 102 has the processing unit (or processor) 120 which is bi-directionally coupled to the internal storage module 150. The storage module 150 may be formed from non-volatile semiconductor read only memory (ROM) 182 and semiconductor random access memory (RAM) 184, as seen in FIG. 13. The RAM 184 may be volatile, non-volatile or a combination of volatile and non-volatile memory.

The electronic device 101 includes a display controller 168, which is connected to a video display 185, such as a liquid crystal display (LCD) panel or the like. The display controller 168 is configured for displaying graphical images on the video display 185 in accordance with instructions received from the embedded controller 102, to which the display controller 168 is connected.

The electronic device 101 also includes user input devices 113 which are typically formed by keys, a keypad or like controls. In some implementations, the user input devices 113 may include a touch sensitive panel physically associated with the display 185 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1, the electronic device 101 also comprises a portable memory interface 160, which is coupled to the processor 120 via a connection 186. The portable memory interface 160 allows a complementary portable memory device 170 to be coupled to the electronic device 101 to act as a source or destination of data or to supplement the internal storage module 150. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 101 also has a communications interface 164 to permit coupling of the device 101 to the computer or communications network 190 via a connection 187. The connection 187 may be wired or wireless. For example, the connection 187 may be radio frequency or optical. An example of a wired connection includes Ethernet. Further, an example of wireless connection includes Bluetooth® type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components such as the sensors 100, is provided to perform that special function. For example, where the device 101 is a digital camera, the components 100 may represent a lens, focus control and image sensor of the camera. The special function components 100 are connected to the embedded controller 102. As another example, the device 101 may be a mobile telephone handset. In this instance, the components 100 may represent those components required for communications in a cellular telephone environment. Where the device 101 is a portable device, the special function components 100 may represent a number of encoders and decoders of a type including Joint Photographic Experts Group (JPEG), (Moving Picture Experts Group) MPEG, MPEG-1 Audio Layer 3 (MP3), and the like.

The OTC methods described hereinafter may be implemented using the embedded controller 102, where the processes of FIGS. 5 and 6 may be implemented as one or more software application programs 133 executable within the embedded controller 102. The electronic device 101 of FIG. 1 implements the described methods. In particular, with reference to FIG. 13, the steps of the described methods are affected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 182 of the internal storage module 150. The software 133 stored in the ROM 182 can be updated when required from a computer readable medium. The software 133 can be loaded into and executed by the processor 120. In some instances, the processor 120 may execute software instructions that are located in RAM 184. Software instructions may be loaded into the RAM 184 by the processor 120 initiating a copy of one or more code modules from ROM 182 into RAM 184. Alternatively, the software instructions of one or more code modules may be pre-installed in a non-volatile region of RAM 184 by a manufacturer. After one or more code modules have been located in RAM 184, the processor 120 may execute software instructions of the one or more code modules.

The OTC application program 133 is typically pre-installed and stored in the ROM 182 by a manufacturer, prior to distribution of the electronic device 101. However, in some instances, the application programs 133 may be supplied to the user encoded on one or more CD-ROM (not shown) and read via the portable memory interface 160 of FIG. 1 prior to storage in the internal storage module 150 or in the portable memory 170. In another alternative, the software application program 133 may be read by the processor 120 from the network 190, or loaded into the controller 102 or the portable storage medium 170 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 185 of FIG. 1. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 13 illustrates in detail the embedded controller 102 having the processor 120 for executing the application programs 133 and the internal storage 150. The internal storage 150 comprises read only memory (ROM) 182 and random access memory (RAM) 184. The processor 120 is able to execute the application programs 133 stored in one or both of the connected memories 182 and 184. When the electronic device 101 is initially powered up, a system program resident in the ROM 182 is executed. The application program 133 permanently stored in the ROM 182 is sometimes referred to as "firmware". Execution of the firmware by the processor 120 may fulfil various functions, including processor management, memory management, device management, storage management and user interface.

The processor 120 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 120 typically also has one or more interfaces 158 for communicating with external devices via system bus 181, using a connection 161.

The OTC application program 133 includes a sequence of instructions 162 though 163 that may include conditional branch and loop instructions. The program 133 may also include data, which is used in execution of the program 133. This data may be stored as part of the instruction or in a separate location 183 within the ROM 182 or RAM 184.

In general, the processor 120 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 13, as detected by the processor 120. Events may also be triggered in response to other sensors and interfaces in the electronic device 101.

The execution of a set of the instructions may require numeric variables to be read and modified. Such numeric variables are stored in the RAM 184. The disclosed method uses input variables 171 that are stored in known locations 172, 173 in the memory 184. The input variables 171 are processed to produce output variables 177 that are stored in known locations 178, 179 in the memory 184. Intermediate variables 174 may be stored in additional memory locations in locations 175, 176 of the memory 184. Alternatively, some intermediate variables may only exist in the registers 154 of the processor 120.

The execution of a sequence of instructions is achieved in the processor 120 by repeated application of a fetch-execute cycle. The control unit 151 of the processor 120 maintains a register called the program counter, which contains the address in ROM 182 or RAM 184 of the next instruction to be executed. At the start of the fetch execute cycle, the contents of the memory address indexed by the program counter is loaded into the control unit 151. The instruction thus loaded controls the subsequent operation of the processor 120, causing for example, data to be loaded from ROM memory 182 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 120 or similar programmatic operation of other independent processor blocks in the electronic device 101.

Figure 2:
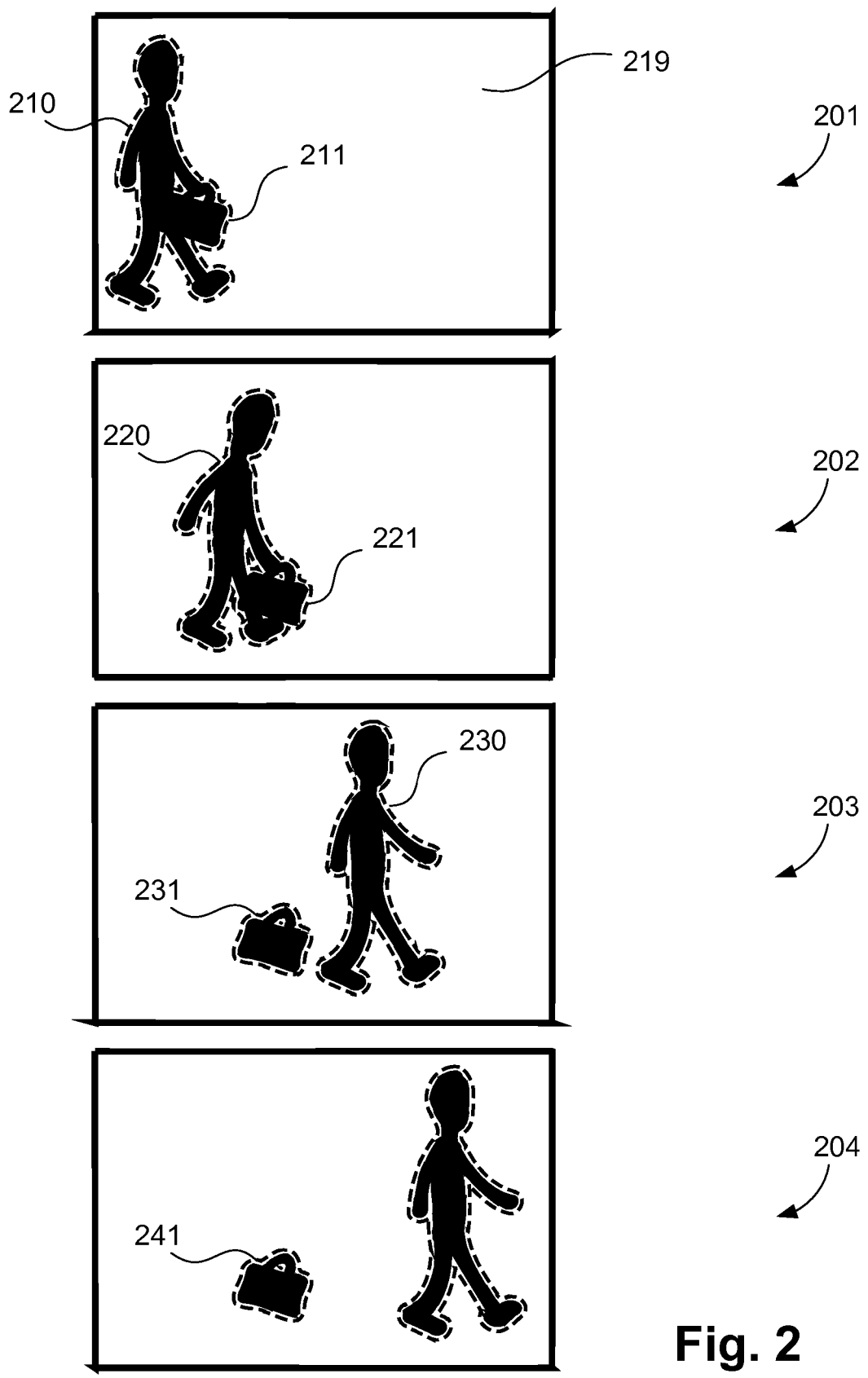
FIG. 2 is a schematic representation illustrating a video scene in which an object is abandoned.

FIG. 2 shows four sequential video frames 201-204 in an image sequence that illustrates detection of an abandoned object according to the OTC method. The sequential video frames 201 to 204 are not necessarily consecutive video frames in this example. In one OTC arrangement, for example, video frames are sampled at a predetermined periodic rate to minimise computational cost. Accordingly, the video frames 201 to 204 may represent every second, fifth, or tenth frame in a video sequence, for example. Alternatively, the video frames 201 to 204 may represent consecutive video frames. Further, the video frames 201 to 204 may be derived from a single video camera or from multiple video cameras.

In the first frame 201 a person 210 enters a scene 219 carrying a bag 211. In a second, later frame 202 a person 220 lowers a bag 221 towards the floor (not shown). In a third, later frame 203 a person 230 walks away from a bag 231 that has been placed on the floor (not shown). In a fourth, later frame 204, a person 240 exits the scene and a bag 241 is on the floor (not shown). The appearance of the bag 231 as it first appears as a separate object in the frame 203 does not substantially change in its appearance 241 in the later frame 204.

A second type of stationary change to a video scene is the removal of an object that was previously considered to form part of the background. In a video surveillance setting, removal of an object that was previously considered to form part of the background could relate to an item of value that is being monitored, such as a painting on a wall. In this case, the change to the visual appearance of the scene is not the object itself, but the newly observed background behind the (removed) object.

Figure 3:
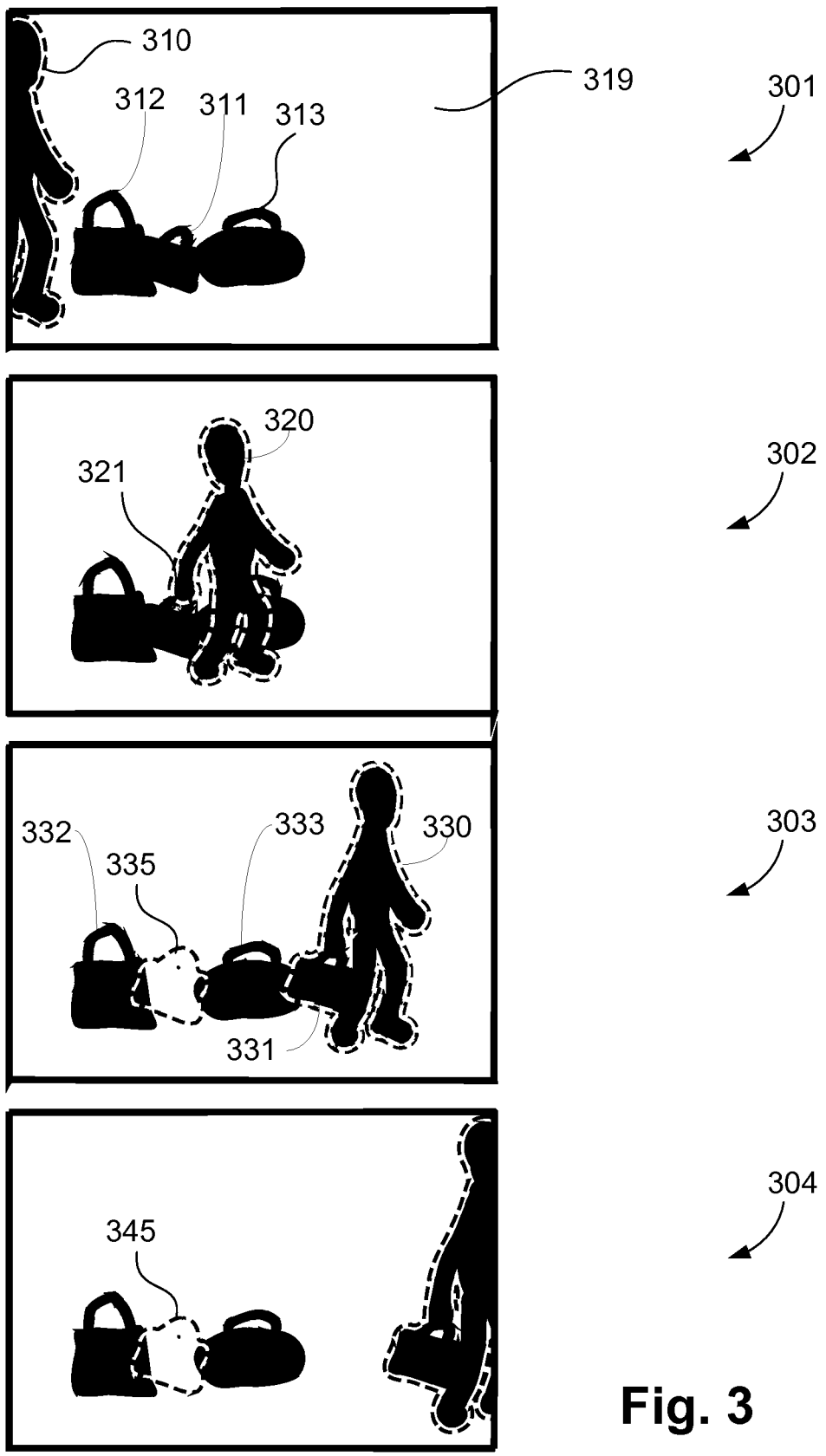
FIG. 3 is a schematic representation illustrating a video scene in which an object is removed.

FIG. 3 shows four sequential video frames 301-304 from an example scenario relating to removed object detection. As described above with reference to FIG. 2, the sequential video frames 301 to 304 are not necessarily consecutive video frames. In one OTC arrangement, for example, video frames are sampled at a predetermined periodic rate to minimise computational cost. Accordingly, the video frames 301 to 304 may represent every second, fifth, or tenth frame in a video sequence, for example. Alternatively, the video frames 301 to 304 may represent consecutive video frames. Further, the video frames 301 to 304 may be derived from a single video camera or from multiple video cameras.

In a first frame 301 three bags 311, 312, 313 have been part of a scene 319 long enough to be considered to be background, as may have been determined from analysis of one or more earlier video frames. A person 310 is shown to have entered the scene 319. In a second, later frame 302 a person 320 takes hold of one of the bags 321, and in a third, later frame 303 the person 330 walks away from the bags 332, 333 while holding bag 331. In the frame 303, the appearance of the background differs in the region 335 that the bag 331 previously occupied. However, the new appearance of the region 345 does not vary in a fourth, later frame 304.

These two types of stationary changes, relating respectively to an abandoned object event and a removed object event, have similar properties. In both cases, the visual elements that constitute the region of change (ie the bag 241 in FIG. 2, and the "empty" region 345 in FIG. 3) are different in appearance from the historic scene model, but otherwise do not change in appearance in subsequent frames during the period of analysis. Hence, these two types of stationary changes can both be classified as regions of change and be potential events that should trigger an alert.

Figure 4:
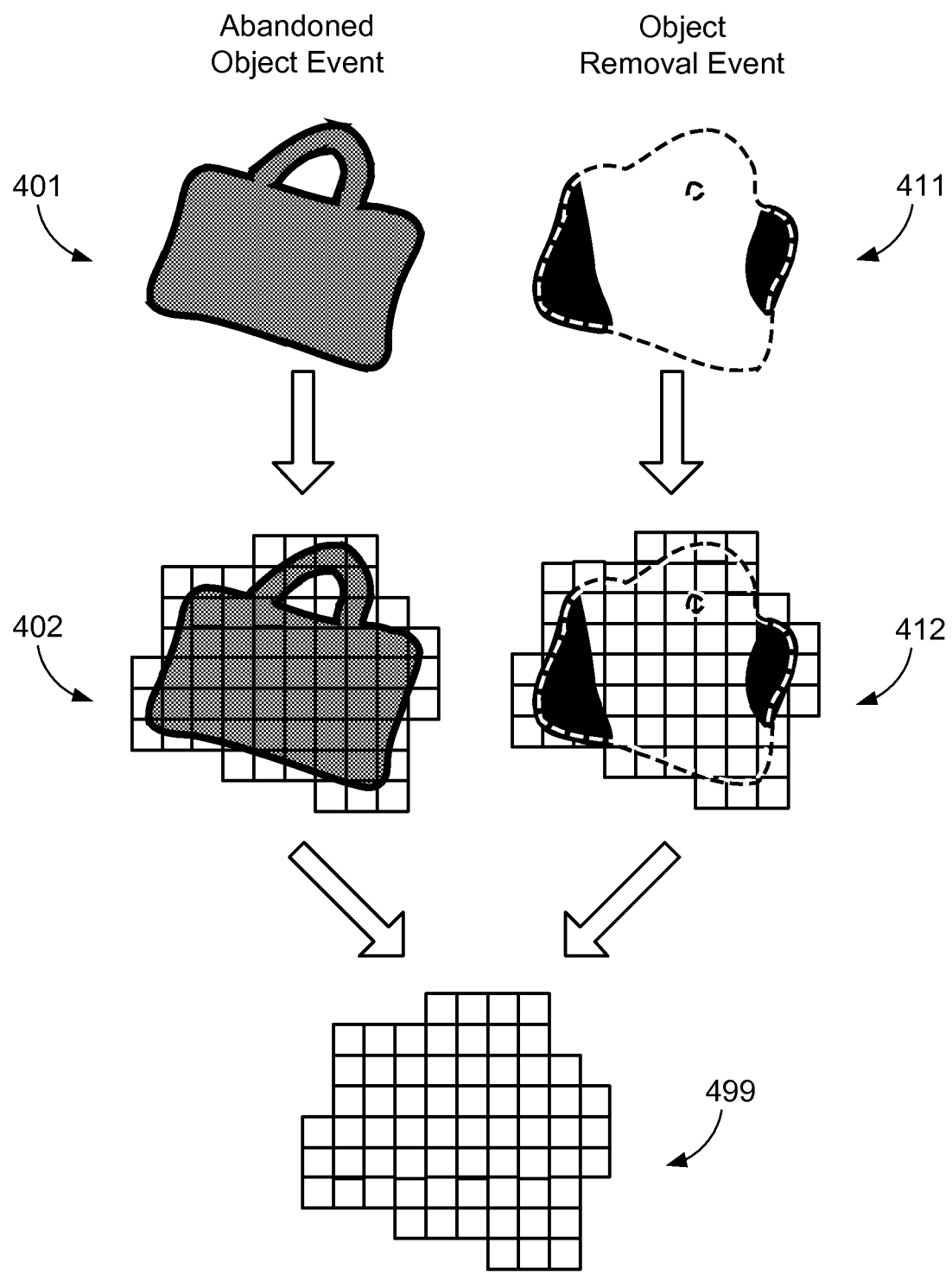
FIG. 4 is a schematic representation illustrating a region of changed detected by the camera for both abandoned object and removed object events.

FIG. 4 illustrates a region of change for both abandoned object events and removed object events. FIG. 4 shows a bag 401 and an "empty" region 411. The "empty" region 411 corresponds to the change in background in the frame 303 when the bag 331 is picked up by the person 330. The bag 401 produces a first region of change 402 and the "empty" region produces a second region of change 412. The first and second regions of change 402 and 412 are difficult to distinguish automatically from one another, based only on a region 499.

Differentiating Between Abandoned and Removed Object Events

Figure 5:
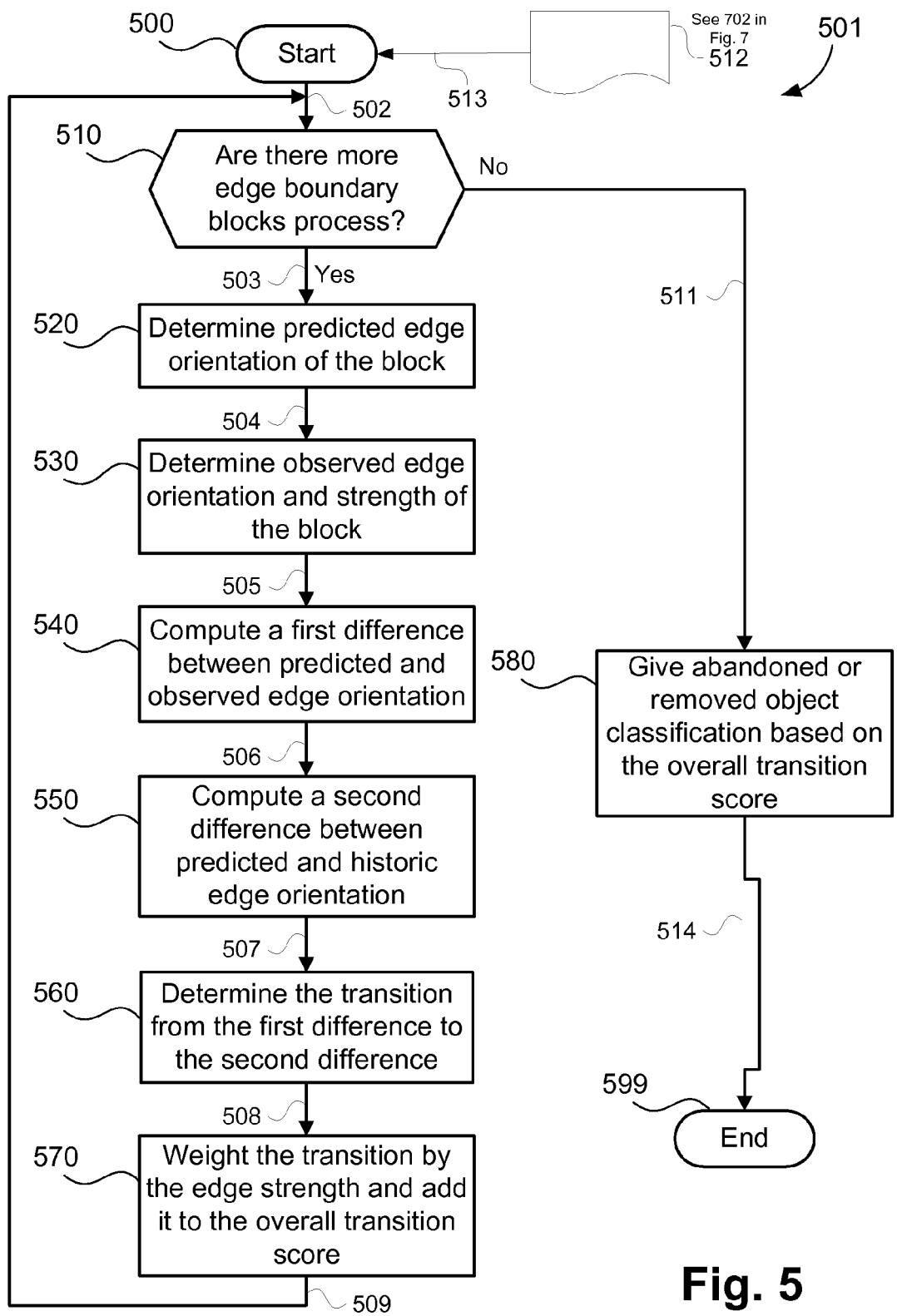
FIG. 5 is a schematic flow diagram illustrating a method of differentiating abandoned object events and removed object events according to one OTC arrangement.

FIG. 5 is a schematic flow diagram of a process 501 for distinguishing between abandoned object events and removed object events according to the disclosed OTC method. The process 501 determines an overall transition score for the region of change based on an accumulation of transition scores for a set of edge boundary blocks associated with the region of change.

The transition score for an edge boundary block is determined based on the difference between a first edge orientation difference and a second edge orientation difference for the block in question. The transition score for a particular edge boundary block indicates that either the historic edge orientation of the block is more aligned with the predicted edge orientation of the block, or that the observed edge orientation of the block is more aligned with the predicted edge orientation of the block. In a preferred OTC arrangement, the transition score for an edge boundary block is weighted by the edge strength of the block before being added to the overall transition score.

The first edge orientation difference for an edge boundary block is the difference between a predicted edge orientation for the edge boundary block based on the local spatial arrangement of blocks in the vicinity of the edge boundary block and the observed edge orientation of the edge boundary block (see 1208 in FIG. 12). The second edge orientation for the edge boundary block is the difference, which represents a temporal change, between a predicted edge orientation for the edge boundary block based on the local spatial arrangement of blocks in the vicinity of the edge boundary block and a historical edge orientation for the edge boundary block (see 1214 in FIG. 12). In the preferred OTC method, the historical edge orientation for the edge boundary block is the edge orientation of the historic scene model for the edge boundary block.

If the overall transition score for the region of change indicates that the observed edge orientations for the edge boundary blocks describing the region of change are more aligned with the predicted edge orientations for the edge boundary blocks, then an abandoned object event is indicated.

If the overall transition score for the region of change indicates that the historic edge orientations for the edge boundary blocks describing the region of change are more aligned with the predicted edge orientations for the edge boundary blocks, then a removed object event is indicated.

In a preferred OTC arrangement the blocks used are Discrete Cosine Transform (DCT) blocks of the video images; however blocks that are the results of other transformation methods can also be used.

The process 501 starts at a step 500 that receives, as depicted by an arrow 513, an input 512 that includes one or more of the boundary blocks describing a detected region of change. A common input is an array of boundary blocks on the outline of the said detected region of change.

Figure 7:
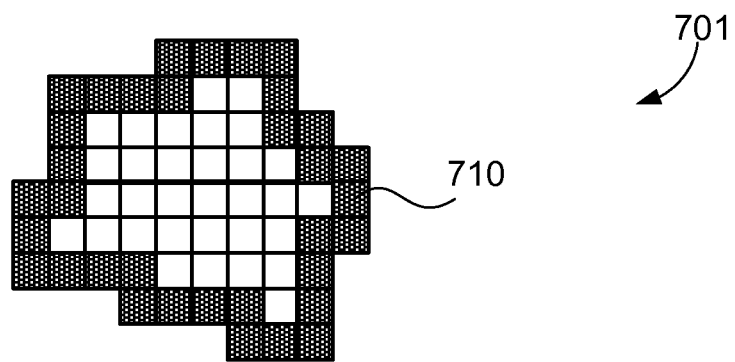
FIG. 7 is a schematic representation illustrating an example of a detected region of change with boundary DCT blocks highlighted.
Figure 7:
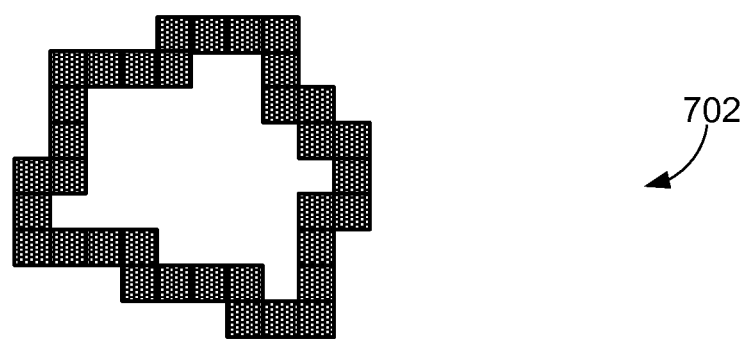

FIG. 7 shows an example of a detected region of change 701 with boundary blocks defining the outer boundary of the region 701 highlighted, and an example of the input to the step 500 of the process 501 is shown as input 702.

One method for determining an object boundary is disclosed in United States Patent Publication No. 2008/0152236 (Vendrig et al.). Other methods for determining a visual object boundary may equally be utilised, such as pixel based object detection and user definition.

Returning to FIG. 5, control proceeds from the step 500, as depicted by an arrow 502, to a decision step 510, in which the processor 120 directed by the OTC software application 133 determines if there are still more boundary blocks to be processed in the sequence of video frames being considered (is this correct?). If there are more boundary blocks to be processed, then control proceeds according to a "Yes" arrow 503 and control passes to a step 520 in which the processor 120 determines a predicted edge orientation of the boundary block that is to be processed. This determination step is performed, for example, based on the location of nearby boundary blocks (see FIG. 8 for more detail), or through user input.

Control then passes from the step 520, as depicted by an arrow 504, to a step 530, in which the processor 120 determines an observed edge orientation and observed edge strength of the boundary block based on equations [5] and [6] respectively using the DCT coefficients of the boundary block being processed.

Control then passes, as depicted by an arrow 505, to a step 540, in which the processor 120 determines a first difference (see 1208 in FIG. 12) between a predicted edge orientation (1204) for the boundary block in question and an observed edge orientation (1205) for the boundary block in question.

The first difference (1208) computed at the step 540 represents how well the observed edge orientation is aligned with the predicted edge orientation.

Control then passes, as depicted by an arrow 506, to a step 550, in which the processor 120 determines a second difference (1214) between the predicted edge orientation (1204) for the boundary block and an edge orientation (1212) of a historic scene model for the boundary block in question.

The second difference (1214) determined at the step 550 represents how well the historic scene model edge orientation (1212) of the boundary block in question is aligned with the predicted edge orientation (1204) of the boundary block in question.

At the step 550, in another OTC arrangement the observed edge orientation obtained at the step 530 can be used instead of the predicted edge orientation for the boundary block.

Control then passes, as depicted by an arrow 507, to a step 560, in which the processor 120 examines the transition of the first difference from the step 540 and the second difference from the step 550 to check a temporal change of edge consistency. A temporal transition to an observed edge orientation that is more consistent with the predicted edge orientation than the historic edge orientation is given a positive score (eg see Example 1 in Table 1 above) for an abandoned object. A temporal transition to an observed edge orientation that is less consistent with the predicted edge orientation than the background edge orientation is given a negative score (eg see Example 2 in Table 1 above) for a removed object.

Control then passes, as depicted by an arrow 508, from the step 560 to a step 570, in which the processor 120 weights the transition by the edge strength calculated at the step 530 to form a transition score. In another OTC arrangement, the transition can be weighted by the edge strength of the historic scene model for the edge boundary block. In another OTC arrangement, the transition is not weighted. In another OTC arrangement, the transition may be weighted by other means, such as the confidence in the prediction. The transition score is then added to the overall transition score. The process 501 then follows an arrow 509 back to the step 510.

Returning to the step 510, if there are no more boundary blocks to be processed, the process 501 is directed from the step 510 by a NO arrow 511 to a step 580. The step 580 determines, using the processor 120 directed by the OTC software application 133, based on the overall transition score, whether the detected region of change is an abandoned object or a removed object. Finally the process 501 is directed, as depicted by an arrow 514, to an END step 599 which completes the processing with respect to the input.

Boundary Traversal for Regions of Change

The method described above with reference to FIG. 5 requires the boundary blocks of a detected region of change as its input 512. Boundary blocks can be found in a number of ways known in the art, e.g. gradient based edge detection, or alternatively the boundary blocks can be specified through user input via the user input devices 113.

Figure 6:
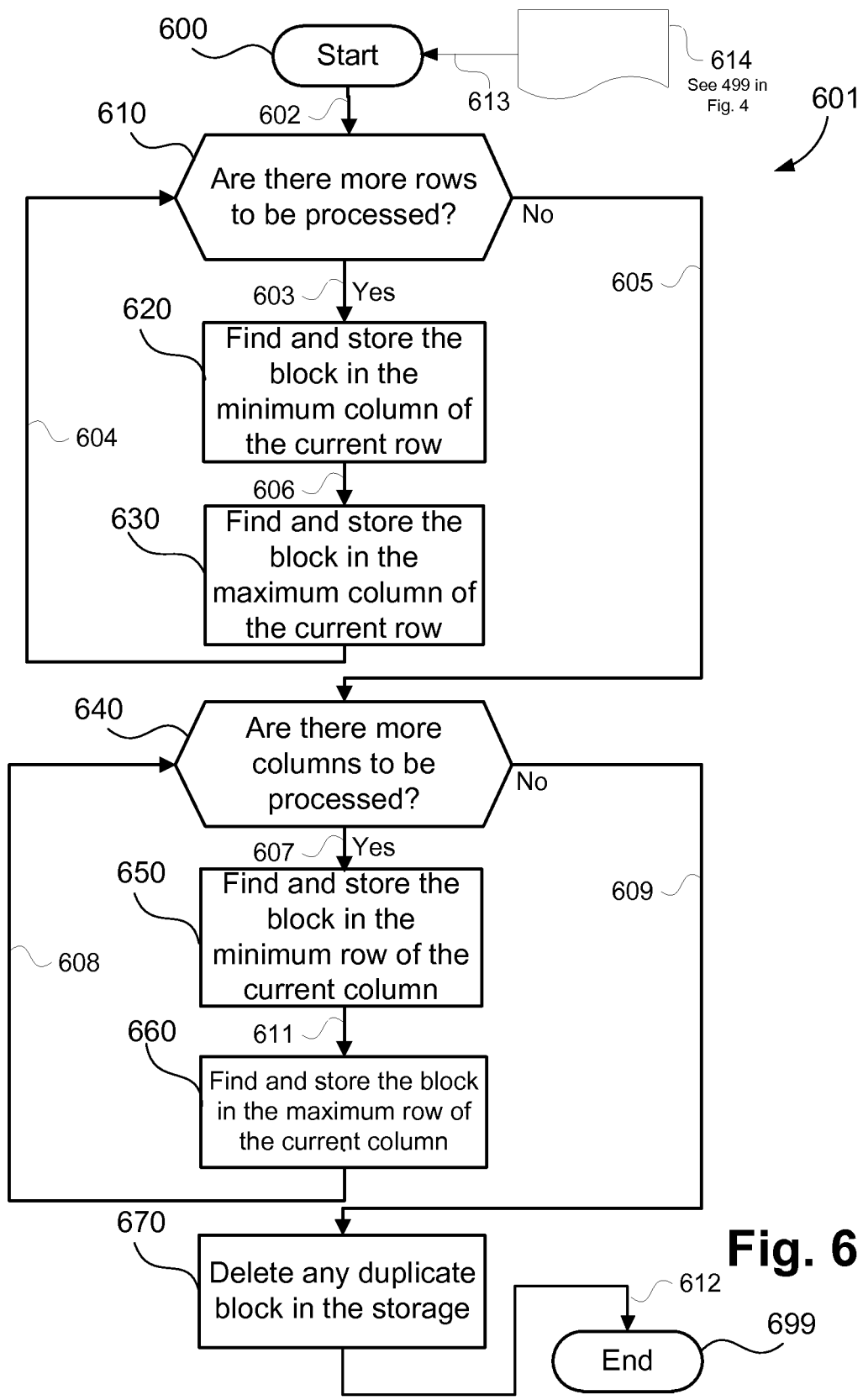
FIG. 6 is a schematic flow diagram illustrating a method of traversing the boundary blocks of a detected region of change, according to one OTC arrangement.

FIG. 6 is a flow diagram illustrating an exemplary method of determining the edge boundary blocks for a region of change. The process 601 starts at a step 600 that receives, as depicted by an arrow 613, an input 614 comprising the blocks of a detected region of change 499 (see FIG. 4). The input can be an array or a list of such blocks. Control then passes, as depicted by an arrow 602, to a decision step 610. If there are still more rows to be processed, flow is directed via a YES arrow 603 to a step 620.

The step 620 finds the left most block, that is, the block with the lowest column value, for the current row of the detected region of change 499. E.g. if there are 3 blocks in the row and their column values are 4, 5 and 6, the block with column value 3 will be selected.

Control then passes, as depicted by an arrow 606, to a step 630 which finds the right most block, that is, the block with the highest column value, for the current row of the detected region of change 499.

Returning to step 610, if there are no more rows to be processed, the process 601 is directed, as depicted by an arrow 605, from the step 610 by a NO arrow to a step 640. In the step 640, if there are still more columns to be processed, flow is directed, as depicted by an arrow 607, via a YES arrow to a step 650, which finds the top most block, that is, the block with the lowest row value, for the current column of the detected region of change 499.

Control then passes, as depicted by an arrow 611, to a step 660 which finds the bottom most block, that is, the block with the highest row value, for the current column of the detected region of change 499.

Returning to the step 640, if there are no more columns to be processed, the process 601 is directed, as depicted by an arrow 609, from the step 640 by a NO arrow to a step 670. In the step 670, any duplicate blocks found in the steps 620, 630, 650 and 660 are deleted. Finally the process 601 is directed, as depicted by an arrow 612, to an END step 699 which completes the processing with respect to the input.

An example of a detected region of change 701 with boundary blocks highlighted 710 is shown in FIG. 7. A subset of the boundary blocks can also be used depending on the application. An example of an input to the step 610 in FIG. 6 is depicted by 702.

Determination of Predicted Edge Characteristics

After the process 501 receives a boundary block at the step 500, a predicted edge characteristic for the boundary block needs to be determined. Predicted edge characteristics that may be used in one or more OTC arrangements are, for example, the orientation of the edge, or the strength of the edge.

In the described OTC examples, "predicted edge characteristics" of a DCT block are determined based on the spatial arrangement of the DCT block in question and adjacent DCT blocks. Furthermore, "observed edge characteristics" of a DCT block is determined for the block in question based on the DCT coefficients of the block.

FIG. 8 is a pictorial representation of a set of predicted edge orientations for selected edge boundary blocks in a region of change. FIG. 8 depicts a set of boundary blocks 810-860, showing how the blocks in each set are spatially arranged.

Foreground blocks are shaded grey, and background blocks are white.

The selected edge boundary block in question is, for each set, located in the middle of the 3 by 3 local spatial arrangement which consists of the current boundary block and its 8 connected adjacent blocks. Thus, for example, considering the set 810 of boundary blocks, the boundary block in question for which the edge orientation is to be determined has a reference numeral 811.

The number and position of the background/foreground adjacent blocks (ie geometrical attributes and configurations) in the local spatial arrangement of each of the sets (eg the set 810) defines the local spatial arrangement of the current boundary block in question (ie the block 811).

To determine the edge orientation of a particular edge boundary block, the local spatial arrangement around the edge boundary block is analyzed with respect to at least some of the local spatial arrangement.

For example, if a boundary block 812 under consideration in the set 820 is part of a vertical arrangement 813, 812, 814, where the adjacent foreground blocks 813 and 814 are respectively directly above and below the edge boundary block in question 812, then the predicted edge orientation associated with the edge boundary block 812 is classified as a vertical line.

As a second example, if an edge boundary block 815 under consideration is part of a corner arrangement set 840, then the predicted edge orientation for the edge boundary block IS classified as a sloped line with 45 degree angle. Further examples of this OTC arrangement are configuration sets 810, 830, 850 and 860, which produce predicted edge orientations of a horizontal line, 135 degree angle, 135 degree angle and 45 degree angle respectively.

This OTC arrangement for determining a predicted edge orientation of a boundary block can be extended to examining nearby boundary blocks beyond just the 8 adjacent blocks.

The neighbourhood blocks described with reference to FIG. 8 are merely some examples of how the predicted edge characteristics of a boundary block can be determined. The following local neighbour pattern lookup table (Table 2) provides a more comprehensive example of how this can be achieved.

In Table 2 "−1" means given the spatial arrangement, a weak edge is predicted. The units used in the rest of the table is [degrees]. Table 2 uses the following encoding method to map each spatial pattern of blocks in the local neighbourhood to a prediction result:

Set the index to 0;
Starting from the top row, if the left-hand side block is a foreground block then add 128 to the index; if the middle block is a foreground block then add 64 and the right-hand side 32;
Moving to the middle row, if the left-hand side block is a foreground block then add 16; the right-hand side 8;
Moving to the last row, if the left-hand side block is a foreground block then add 4 to the index; if the middle block is a foreground block then add 2 and the right-hand side 1;
Look up the final index in the table and it gives the prediction result.

It is noted that Table 2 is a 1 dimensional table which is depicted in 2 dimensions for convenience.

| | | | | | | | |
|---|---|---|---|---|---|---|---|
| −1 | 45 | −1 | 30.9375 | 135 | −1 | 149 | 0 |
| −1 | 59 | 45 | 45 | 136.375 | −1 | 163.375 | 20.1875 |
| −1 | 43.5625 | 135 | 16.5625 | 121 | −1 | 135 | 159.75 |
| −1 | 40 | −1 | 45 | 140 | −1 | 135 | −1 |
| 135 | −1 | 133.5625 | −1 | 135 | −1 | 0 | 0 |
| 121 | 90 | 106.5625 | 69.75 | 90 | 90 | 45 | 45 |
| 136.375 | −1 | 135 | 135 | 90 | 62 | 135 | 135 |
| 140 | −1 | 151.0625 | 59.9375 | 121 | 90 | 135 | −1 |
| −1 | 46.375 | −1 | 49.9375 | 133.5625 | 0 | 130 | −1 |
| 135 | 73.375 | −1 | 70.5625 | 135 | 33.0625 | 118.875 | 30 |
| 45 | 45 | −1 | 61.125 | 106.5625 | 146.875 | 109.375 | 150 |
| −1 | 28.8125 | −1 | 45 | 151.0625 | −1 | 135 | −1 |
| 149 | −1 | 130 | −1 | 0 | 27.9375 | 149 | 0 |
| 135 | 110.1875 | 109.375 | −1 | 135 | 135 | −1 | −1 |
| 163.375 | 123.0625 | 118.875 | −1 | 45 | 45 | −1 | −1 |
| 160.5625 | 120 | 135 | −1 | −1 | −1 | 135 | 135 |
| 45 | 45 | 46.375 | 0 | −1 | 45 | −1 | 0 |
| 43.5625 | 90 | 45 | 45 | 90 | 118 | 123.0625 | 45 |
| 59 | 90 | 73.375 | 135 | 90 | 90 | 110.1875 | 135 |
| 40 | 45 | 28.8125 | −1 | −1 | 90 | 120 | −1 |
| −1 | 45 | 0 | 0 | 135 | −1 | 0 | −1 |
| −1 | 0 | 146.875 | 45 | 62 | −1 | 45 | 45 |
| −1 | 118 | 33.0625 | 135 | 90 | −1 | 135 | 135 |
| −1 | 0 | −1 | −1 | 90 | 90 | −1 | 90 |
| 30.9375 | 0 | 49.9375 | 0 | −1 | 152 | −1 | 0 |
| 16.5625 | 135 | 61.125 | 45 | 56.875 | 135 | −1 | 0 |
| 45 | 45 | 45 | 45 | 69.75 | 45 | −1 | −1 |
| 19.375 | −1 | 45 | 45 | 59.9375 | −1 | −1 | 45 |
| 0 | 158.875 | −1 | 0 | 0 | −1 | 0 | 0 |
| 159.75 | 135 | 150 | −1 | 135 | 135 | −1 | 0 |
| 20.1875 | 45 | 30 | −1 | 45 | 45 | −1 | 0 |
| −1 | −1 | −1 | 45 | −1 | 90 | 135 | −1 |

Determination of Observed Edge Characteristics

After a predicted edge characteristic is determined at the step 520 of the process 501 of FIG. 5, flow passes, as depicted by the arrow 504, to the step 530 where the observed edge characteristic of the edge boundary block is determined.

One method of determining observed edge characteristics, such as edge orientation and edge strength, is through calculations using the DCT coefficients of the edge boundary block under consideration. Edges in a block can be considered to be those pixels that have the greatest change in intensity in the Y channel. One OTC arrangement uses only 4 DCT coefficients to calculate the intensity in the Y channel through the equations:

$$f(x) = AC_{01}\cos\left(\frac{\pi}{8}(x+0.5)\right) + AC_{02}\cos\left(\frac{2\pi}{8}(x+0.5)\right) \quad [1]$$

$$g(y) = AC_{10}\cos\left(\frac{\pi}{8}(y+0.5)\right) + AC_{20}\cos\left(\frac{2\pi}{8}(y+0.5)\right) \quad [2]$$

$$(0 \le x \le 7), (0 \le y \le 7)$$

in the horizontal and vertical directions respectively, where x and y are the pixel numbers from the origin 903, f(x) is the intensity of the Y channel in the horizontal direction and g(y) is the intensity of the Y channel in the vertical direction.

Figure 9:
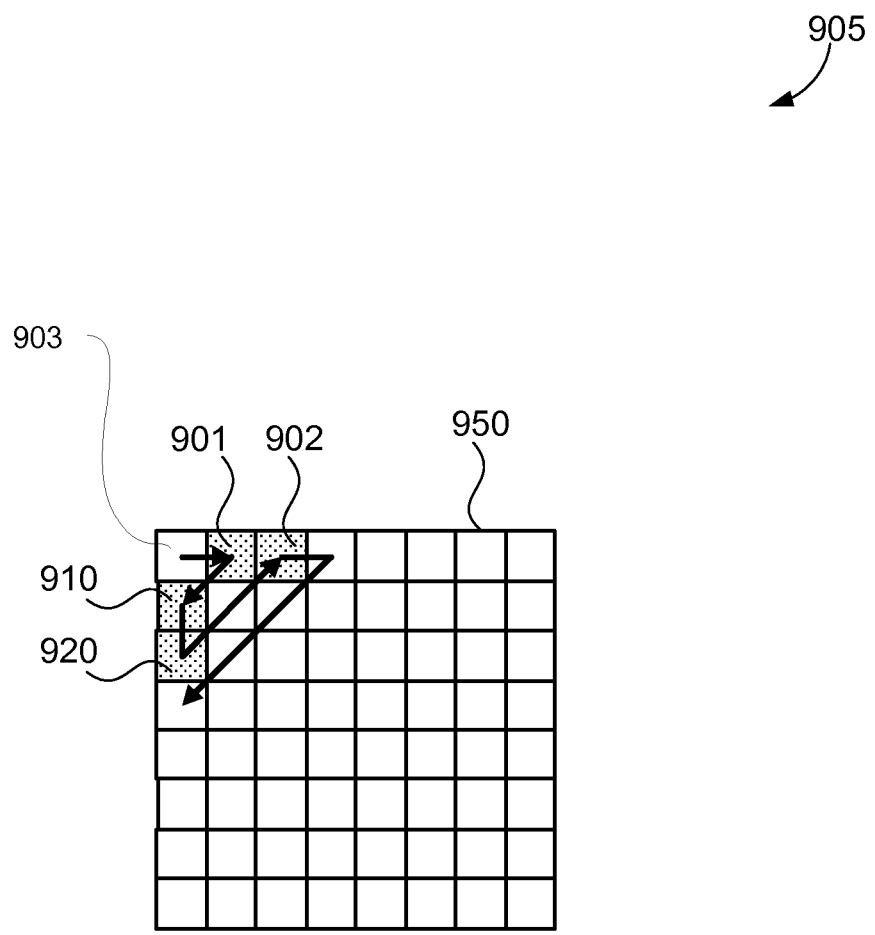
FIG. 9 is a schematic representation illustrating an example of a DCT coefficient table arranged in a zig-zag pattern.

$AC_{ij}$ represents the DCT coefficients in row i and column j measured from a top left hand coefficient 903, as shown in FIG. 9 with respect to a DCT coefficient table 950. Arranging the DCT coefficient table 950 in a zigzag pattern, as shown, then the coefficients used are $AC_{01}$ (ie 901), $AC_{02}$ (ie 902), $AC_{10}$ (ie 910) and $AC_{20}$ (ie 920).

The intensity gradient in the horizontal and vertical directions for the 8 distances can then be calculated by taking the derivative of Equation [1] and Equation [2].

$$f'(x) = -AC_{01}\left(\frac{\pi}{8}\right)\sin\left(\frac{\pi}{8}(x+0.5)\right) - AC_{02}\left(\frac{2\pi}{8}\right)\sin\left(\frac{2\pi}{8}(x+0.5)\right) \quad [3]$$

$$g'(x) = -AC_{01}\left(\frac{\pi}{8}\right)\sin\left(\frac{\pi}{8}(y+0.5)\right) - AC_{02}\left(\frac{2\pi}{8}\right)\sin\left(\frac{2\pi}{8}(y+0.5)\right) \quad [4]$$

$$(0 \le x \le 7), (0 \le y \le 7)$$

Where f'(x) is the intensity gradient of the Y channel in the horizontal direction and g'(y) is the intensity gradient of the Y channel in the vertical direction.

The 8 values obtained in each direction are used both to determine the observed edge strength as well as the observed edge orientation of the block 905 as follows.

The observed edge strength (used at the step 570) is given by:

$$\sqrt{f'(x)^2 + g'(y)^2}\,\text{max} \quad [5]$$

where f'(x) and g'(y) are the values obtained in each direction as calculated using Equation [3] and Equation [4].

The observed edge orientation (in degrees) is given by:

$$\tan^{-1}\left(\frac{g'(y)\text{max}}{f'(x)\text{max}}\right) + 90° \quad [6]$$

where f'(x)max and g'(y)max are the maximum values in each direction as calculated using Equation [3] and Equation [4].

Transition Score Calculation

As noted in the step 540, the first difference between the predicted edge orientation and the observed edge orientation is determined, while a second difference between the predicted edge orientation and the historic scene model edge orientation is determined at the step 550 of process 501. At the step 560, a transition score is calculated for the boundary block under consideration. The two differences represent how the observed edge orientation and how the historic scene model edge orientation are aligned with the prediction. A transition towards more consistent (i.e. the historic scene model is less aligned with the prediction than the observed edge orientation) will receive a positive score. A transition towards less consistent (i.e. the historic scene model is more aligned with the prediction than the observed edge orientation) will receive a negative score.

As in the step 570, such a transition score is weighted by the edge strength in Equation [5]. In one OTC arrangement, the edge strength is quantised before the transition score is weighted. In another OTC arrangement, the edge is binned before the transition score is weighted. In another OTC arrangement, the transition score is weighted by the confidence of the prediction. In another OTC arrangement, the transition score is weighted by a function of the historic scene model edge strength and observed edge strength. In another OTC arrangement, the transition score is not weighted.

Figure 10:
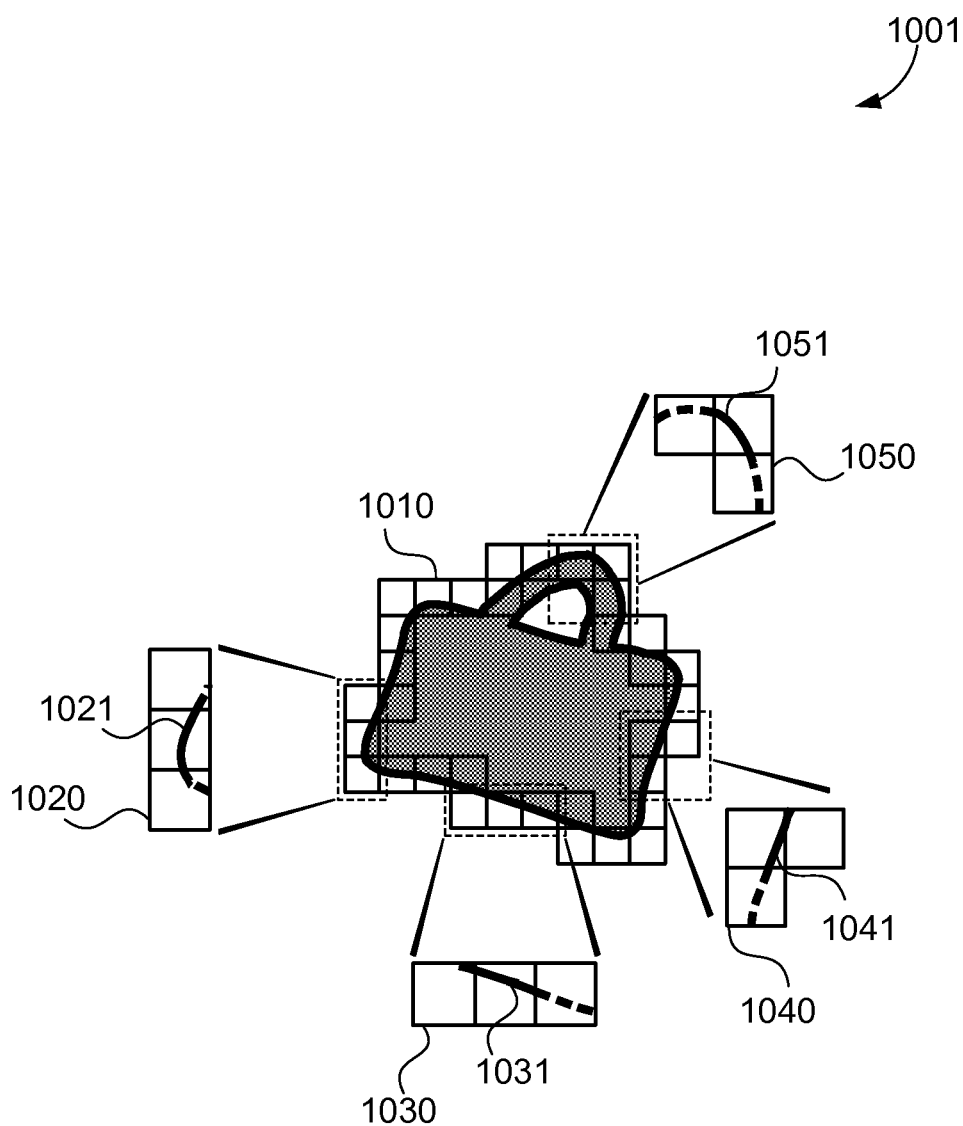
FIG. 10 is a schematic representation illustrating the observed edge characteristics of a detected region of change for an abandoned object event, according to one OTC arrangement.

FIG. 10 is a schematic representation 1001 that shows the observed edges of the object 241 in FIG. 2. FIG. 10 comprises of a set of boundary blocks 1010 of a detected region of change. For boundary block sets 1020, 1030, 1040 and 1050, which correspond to the similar local spatial arrangements 820, 810, 840 and 830 as respectively illustrated in FIG. 8, the observed edge orientations are shown as 1021, 1031, 1041 and 1051 respectively.

In the last step 570 of process 501, the transition score for the current boundary block is determined and added to the overall transition score for the detected region of change.

When all the boundary blocks for a particular detected region of change have been processed, the flow of process 501 is directed to step 580 where the overall transition score for the region is examined. A net positive score indicates the presence of more blocks that had observed strong edges and that are more aligned with the blob shape than the historic scene model, thus suggesting an abandoned object. A net negative score indicates that the historic scene model is more aligned with the blob shape or indicates the presence of more blocks that had observed strong edges that are less aligned with the blob shape than the historic scene model, this being indicative of a region from which a foreground object has been removed.

One advantage of this OTC arrangement is that no threshold value is required to be specified as the overall score is always compared against 0.

INDUSTRIAL APPLICABILITY

The arrangements described are applicable to the computer and data processing industries and particularly for the surveillance industry.

The foregoing describes only some embodiments of the present invention, and modifications and/or changes can be made thereto without departing from the scope and spirit of the invention, the embodiments being illustrative and not restrictive.

The invention claimed is:

1. A computer-implemented method for classifying a detected region of change of a video frame as one of an abandoned object and a removed object, wherein a plurality of boundary blocks define a boundary of said detected region of change, said method comprising the steps of:
(1) for each one of the plurality of said boundary blocks:
  (a) determining a first difference between a predicted edge orientation and an observed edge orientation of said boundary block;
  (b) determining a second difference between a historical edge orientation of said boundary block and at least one of the predicted edge orientation and the observed edge orientation of said boundary block; and
  (c) determining a temporal change of edge consistency based on the first and second difference; and
(2) classifying said detected region of change as one of the abandoned object and the removed object based on one or more of the plurality of determined temporal changes of edge consistency, wherein the classifying step comprises, in regard to each one of the set of boundary blocks, the steps of:
  assigning a first block score to the boundary block for the removed object if the determined temporal change of edge consistency of the boundary block indicates a transition from a more aligned state to a less aligned state;
  assigning a second block score to the boundary block for the abandoned object if the determined temporal change of edge consistency of the boundary block indicates a transition from a less aligned state to a more aligned state; and
  determining said overall score for said region of change by determining a sum of said individual block scores and weighting said individual block scores using said observed edge orientation of each one of said boundary blocks.

2. The method according to claim 1, wherein said detected region of change is defined by a set of spatially adjacent neighbouring visual elements that differ from a historic scene model of a scene in said video frame, wherein said plurality of boundary blocks comprise the outer boundary of the set of spatially adjacent neighbouring visual elements.

3. The method according to claim 1, wherein said predicted edge orientation are determined based on a relative position of at least one neighbouring block for each said boundary block.

4. The method according to claim 1, wherein said predicted edge orientation is determined based on user input.

5. The method according to claim 1, wherein said predicted edge orientation is determined based on a geometrical attribute of said boundary.

6. The method according to claim 1, wherein said observed edge orientation of each one of said set of boundary blocks is determined based at least on DCT coefficients of the boundary block.

7. A computer-implemented method for classifying a detected region of change of a video frame as an abandoned object or a removed object, said method comprising the steps of:
  determining a first difference between a predicted edge orientation and an observed edge orientation of the detected region of change;
  determining a second difference between a historical edge orientation of the detected region of change and at least one of the predicted edge orientation and the observed edge orientation of the detected region of change; and
  determining a temporal change of edge consistency based on the first and second difference; and
  classifying the detected region of change as an removed object if the temporal change of the edge consistency is from a more consistent state to a less consistent state or classifying the detected region of change as an abandoned object if the temporal change of the edge consistency is from a less consistent to a more consistent state, wherein the classifying step comprises, in regard to each one of the set of boundary blocks, the steps of:
  assigning a first block score to the boundary block for the removed object if the determined temporal change of edge consistency of the boundary block indicates a transition from a more aligned state to a less aligned state;
  assigning a second block score to the boundary block for the abandoned object if the determined temporal change of edge consistency of the boundary block indicates a transition from a less aligned state to a more aligned state; and
  determining said overall score for said region of change by determining a sum of said individual block scores and weighting said individual block scores using said observed edge orientation of each one of said boundary blocks.

8. An apparatus for classifying a detected region of change of a video frame as indicating one of an abandoned object and a removed object, wherein a plurality of boundary blocks define a boundary of said detected region of change, said apparatus comprising:
  a processor; and
  a memory storing a processor executable software program for directing the processor to execute a method comprising the steps of:
  (1) for each one of the plurality of said boundary blocks
    determining a first difference between a predicted edge orientation and an observed edge orientation of said boundary block;
    determining a second difference between a historical edge orientation of said boundary block and at least one of the predicted edge orientation and the observed edge orientation of said boundary block; and
    determining a temporal change of edge consistency based on the first and second difference; and:
  (2) classifying said detected region of change as one of the abandoned object and the removed object based on one or more of the plurality of determined temporal changes of edge consistency, wherein the classifying step comprises, in regard to each one of the set of boundary blocks, the steps of:
    assigning a first block score to the boundary block for the removed object if the determined temporal change of edge consistency of the boundary block indicates a transition from a more aligned state to a less aligned state;
    assigning a second block score to the boundary block for the abandoned object if the determined temporal change of edge consistency of the boundary block indicates a transition from a less aligned state to a more aligned state; and
    determining said overall score for said region of change by determining a sum of said individual block scores and weighting said individual block scores using said observed edge orientation of each one of said boundary blocks.

9. A non-transitory computer readable medium storing a processor executable software program for directing a processor in an apparatus for classifying a detected region of change of a video frame as indicating one of an abandoned object and a removed object, wherein a plurality of boundary blocks define a boundary of said detected region of change, said method comprising the steps of:
(1) for each one of the plurality of said boundary blocks;
determining a first difference between a predicted edge orientation and an observed edge orientation of said boundary block;
determining a second difference between a historical edge orientation of said boundary block and at least one of the predicted edge orientation and the observed edge orientation of said boundary block; and
determining a temporal change of edge consistency based on the first and second difference; and:
(2) classifying said detected region of change as one of the abandoned object and the removed object based on one or more of the plurality of determined temporal changes of edge consistency, wherein the classifying step comprises, in regard to each one of the set of boundary blocks, the steps of:

assigning a first block score to the boundary block for the removed object if the determined temporal change of edge consistency of the boundary block indicates a transition from a more aligned state to a less aligned state;

assigning a second block score to the boundary block for the abandoned object if the determined temporal change of edge consistency of the boundary block indicates a transition from a less aligned state to a more aligned state; and determining said overall score for said region of change by determining a sum of said individual block scores and weighting said individual block scores using said observed edge orientation of each one of said boundary blocks.

* * * * *